United States Patent [19]
Loepfe et al.

[11] 3,723,933
[45] Mar. 27, 1973

[54] TRIBO-ELECTRICAL TRANSDUCER FOR MONITORING THE MOVEMENT OF THREAD-LIKE STRUCTURES

[75] Inventors: Erich Loepfe, Zollikerberg; Walter Keller, Kempten; Karl Zweifel, Grut, all of Switzerland

[73] Assignee: Aktiengesellschaft Gebruder Loepfe, Wetzikon, Switzerland

[22] Filed: Sept. 30, 1971

[21] Appl. No.: 185,212

[30] Foreign Application Priority Data

Apr. 29, 1971 Switzerland..........................6321/71

[52] U.S. Cl............................................338/2, 338/5
[51] Int. Cl.................................................G01l 1/22
[58] Field of Search ....................338/2, 5, 6; 73/88.5

[56] References Cited

UNITED STATES PATENTS 2,645,121  7/1953  Scott.....................................338/5 X Primary Examiner—C. L. Albritton
Attorney—Werner W. Kleeman

[57] ABSTRACT

A tribo-electric transducer for monitoring the movement of thread-like structures, comprising a friction body against which bear the traveling threads, at least one electrode body arranged at the friction body and a housing consisting of an electrically conductive material serving as the screening for the friction body and the electrode body. The invention contemplates the provision of guide means for simultaneously guiding a number of threads over the friction body, and means for changing the spacing between the friction body and other parts of the transducer or for altering the contact pressure between at least one of the threads and the friction body.

14 Claims, 5 Drawing Figures

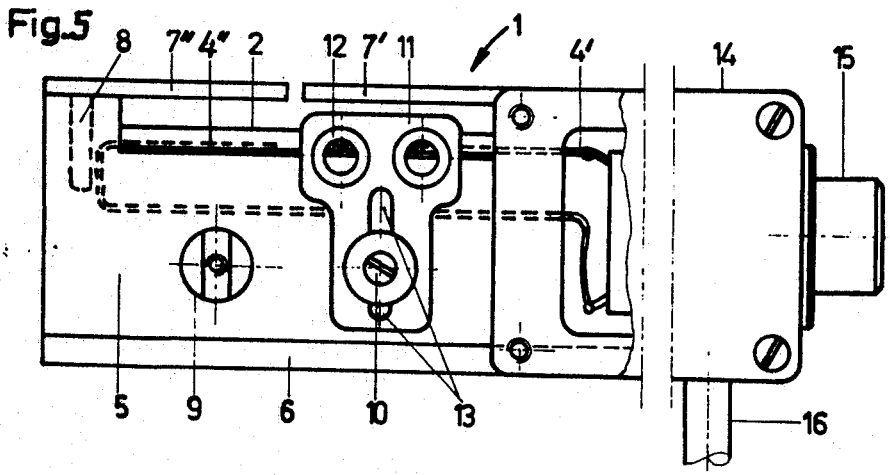

TRIBO-ELECTRICAL TRANSDUCER FOR MONITORING THE MOVEMENT OF THREAD-LIKE STRUCTURES

BACKGROUND OF THE INVENTION

The present invention relates to a new and improved tribo-electrical transducer for monitoring the movement of thread-like structures and which is of the type incorporating a friction body against which bears the traveling thread, at least one electrode body arranged at the friction body and a housing formed of electrically conductive material serving as the screening for the friction body and the electrode body, and this invention also concerns the use of the inventive transducer.

Tribo-electrical transducers of this general type are known in the art for the purpose of monitoring the movement of a single textile thread, mention being specifically here made of Swiss Pat. No. 479,478 and Italian Pat. No. 866,312 just to indicate a few. It is also known to provide special press-on or contact elements at a tribo-electrical transducer, these press-on elements acting directly at the thread at its contact location with the friction body, thereby affording good contact between the thread and the friction body. Furthermore, for this purpose there has also been proposed the use of guide elements through which the thread is guided in such a way that owing to the thread tension there prevails a sufficient contact pressure against the friction body. Means for varying the contact pressure for the purpose of influencing the magnitude of the electrical thread travel signal delivered by the transducer, in other words for varying the sensitivity of the transducer, are not provided with these prior art constructions and are also not necessary since generally regulation of the amplification can be undertaken at an electronic evaluation circuit coupled with the transducer.

SUMMARY OF THE INVENTION

Therefore, it is a primary object of the present invention to provide a novel construction of tribo-electrical transducer of the aforementioned type which renders possible monitoring the travel of a number of threads guided over the friction body of the transducer, and also randomly changing the sensitivity of the transducer, that is to say, the magnitude of the electrical thread travel signal delivered by the individual threads.

During use at a shuttleless loom for color weaving the problem exists that during successive work cycles which follow one another in time always only one of a number of weft or filling threads are inserted. For example, if six different filling threads are present, then, during one filling pick five of the threads are in a rest condition, whereas only the sixth thread is in movement and needs to be monitored. The inventive tribo-electrical transducer can be utilized with particular advantage for such type looms, whereby the sensitivity for the individual threads can be advantageously adjusted to a given value which is the same for all threads.

Now in order to implement the aforementioned objectives and others which will become more readily apparent as the description proceeds, the tribo-electrical transducer of this invention is generally manifested by the features that guide elements are provided for the simultaneous guiding of a plurality of threads over the friction body, and there is also provided means for altering the spacing between the friction body and other parts of the transducer or for changing the contact pressure between at least one of the threads and the friction body.

The transducer designed in accordance with a preferred physical manifestation of this invention possesses a very simple and robust construction and is practically insensitive to contaminants which normally are present during textile processing. The construction of inventive transducer possesses the particular advantage that only a single friction body and only a single signal evaluation circuit is required for monitoring a number of threads. This feature considerably simplifies the construction and provides a rather extensive insensitivity against mechanical effects, such as impacts and vibrations which, as is well known in this particular art, oftentimes occur during loom operation.

BRIEF DESCRIPTION OF THE DRAWING

The invention will be better understood and objects other than those set forth above, will become apparent when consideration is given to the following detailed description thereof. Such description makes reference to the annexed drawings wherein:

FIG. 5 is a side view of a modification of the transducer shown in FIGS. 1–4.

DETAILED DESCRIPTION OF THE PREFERRED EMBODIMENTS

Figures 3, 4:
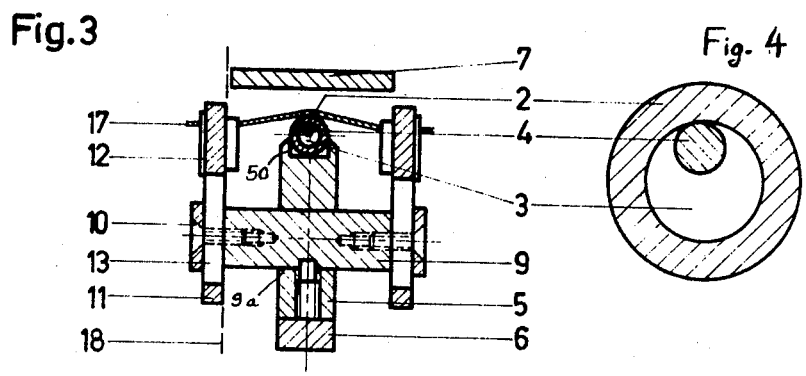
FIG. 3 is a sectional view of the transducer illustrated in FIG. 2, taken substantially along the line III—III thereof.
FIG. 4 is an enlarged cross-sectional view of the friction body of the transducer of this invention.

Describing now the drawings, it will be understood that the tribo-electrical transducer 1 illustrated in the drawings embodies a friction body or element 2 constructed as a hollow cylindrical rod having a continuous lengthwise bore 3, as best seen by referring to FIGS. 3 and 4. A wire-shaped electrode body 4 extends over the length of the bore 3 of friction body 2. This electrode body 4 should extend at least over the useful length of the friction body 2, in other words throughout that portion over which the threads are guided and are in frictional contact with such friction body. The electrode body 4 is advantageously fixedly positioned in the longitudinal bore 3 through the use of any suitable setting adhesive mass. In the embodiment under consideration the friction body 2 is formed of an electrical insulating material of "great hardness", as such term will be defined more fully hereinafter, preferably ceramic oxide.

The friction body 2 bears over its entire length upon an elongated carrier or support 5, the cross-section of which in its basic form is of substantially elongate rectangular configuration, but which however at its upper side is provided with a lengthwise extending groove 50 (FIG. 3) for conveniently accommodating friction body 2.

Figure 1:
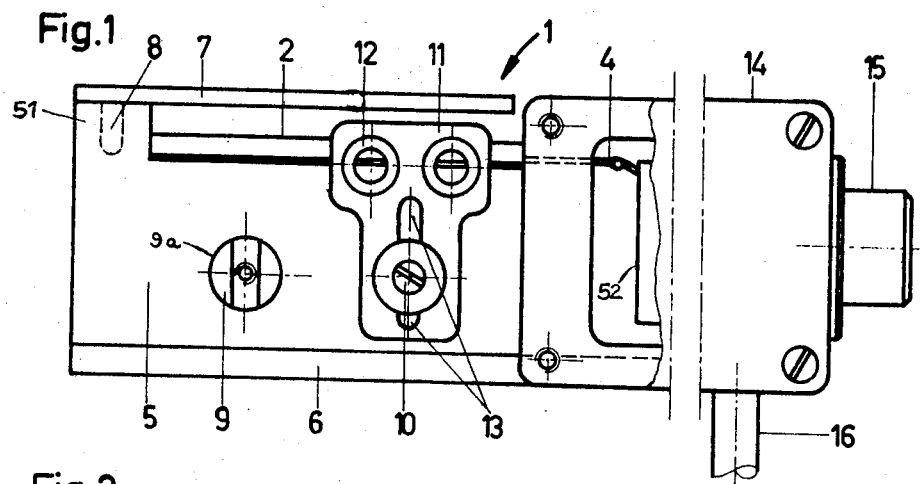
FIG. 1 is a side view of a preferred embodiment of inventive tribo-electrical transducer, parts having been removed or broken away in order to expose components thereof which are situated behind such removed or broken away parts.

At the free end of the carrier or support 5 which extends past the end of the friction body 2, as best observed by referring to the left-side of FIG. 1, there is provided an upwardly extending projection or shoulder 51. This protruding shoulder 51 serves for the attachment of a substantially elongate-rectangular cover member 7 having journal or pivot pins 8 which engage into a suitable bore or recess of the aforementioned shoulder 51. Owing to this arrangement the cover member 7 is pivotably secured at the support 5 so that it can be laterally pivoted. By changing the spacing between the cover member 7 and the friction body 2 it is possible to influence the sensitivity of the transducer.

Now closely beneath the lengthwise axis of the support 5 transverse bolts 9 are fixedly inserted into two transverse bores 9a. At both ends of each transverse bolt 9 there are attached by means of screws 10 the respective guide plates 11. At each of these guide plates 11 there is provided an elongate slot 13 for the throughpassage of the screws 10, so that guide plates 11 can be adjusted in the direction of an axis 18 (FIG. 3) which crosses at right angles the lengthwise axis of the friction body 2. In order to improve clarity in illustration, in FIG. 1 the guide plates arranged at the front transverse bolts 9 at the left thereof have been conveniently omitted.

At the upper region of each of the guide plates 11 there are inserted two guide rings 12 formed of insulating material of great hardness, again for instance ceramic oxide, these guide rings 12 being arranged in offset relationship with regard to one another in the direction of the lengthwise axis of the friction body 2. Normally the guide plates 11 are adjusted such that the openings of the guide rings 12 are located below the free upper edge of the friction body 2, so that a tensioned thread 17 which is guided through two such rings arranged at both sides of the friction body and over the friction body itself assumes a slightly flexed path, as best seen by referring to FIG. 3.

Also as particularly well recognized by viewing FIG. 3 to both sides of the lengthwise axis of the friction body 2 there are arranged a respective row of such guide plates 11 in such a manner that a respective guide ring 12 at one side is situated opposite a cooperating guide ring 12 at the other side. An exact axial alignment of two such cooperating rings 12 which are arranged in confronting relationship to one another is not necessary during operation; in principle it is in fact sufficient if only one of two oppositely situated guide plates 11 can be adjusted. Nonetheless, the possibility of adjusting both guide plates 11 provides for an even more exact variation of the contact pressure of each thread 17 against the friction body 2, and therefore, affords a greater variation of the electrical thread travel signal resulting from the frictional contact between such thread and the friction body.

In the described embodiment the support 5, the cover 7, the guide plates 11 as well as the transverse bolts 9 are formed of metal, in other words an electrically conducting material, and these components are conductively connected with one another at their contact locations, so that such components or parts form a housing which acts as the screening for the friction body 2 and the electrode body 4.

Figure 2:
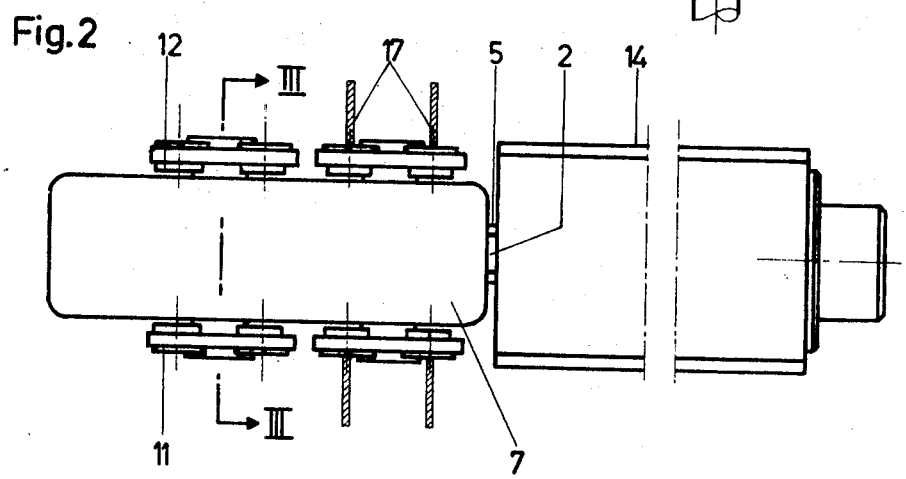
FIG. 2 is a top plan view of the transducer depicted in FIG. 1.

Furthermore, the transducer 1 encompasses an amplifier means with a substantially box-shaped closed amplifier housing 14 formed of metal, which carries at its rear end which is remote from the friction body 2 a mounting plug 15, as best shown by referring to FIGS. 1 and 2. Housing 14 is mechanically and electrically conductively connected with the support 5 through the intermediary of an inserted rail 6 formed of metal, and therefore forms a structural unit together with the already described components of the transducer.

The front side wall of the amplifier housing 14 is partially broken away in FIG. 1 so as to expose the end of the electrode body 4 which will be seen to extend into the internal compartment or space of the amplifier means and which is connected with a pre-amplifier, generally indicated at 52. A cable 16 serves to connect the pre-amplifier with a suitable non-illustrated electronic evaluation circuit which has not been particularly shown since it does not constitute part of this invention.

The described tribo-electrical transducer can be used for monitoring thread travel at textile machines, especially shuttleless looms used for color weaving, wherein in each case only one of a number of filling threads are inserted and monitored.

The construction of transducer can be modified in a number of different aspects in relation to the described embodiment. Thus, it is possible to considerably vary the number of available adjustable guide elements. For instance, it has been possible to successfully test embodiments having up to eight pairs of guide rings, that is suitable for handling eight threads. In so doing it is possible to arrange at each guide plate only one or also more than two, for instance four guide rings. Further, only a part of the available guide plates can be designed to be adjustable. Hence, for instance all of the guide elements at one side of the friction body can be fixedly mounted and non-adjustable, whereas the guide elements located at the other side are adjustable.

With appropriate construction of the entire transducer the material of the friction body can also be conductive; if desired, then the friction body and electrode body can be designed as a unitary workpiece. In such case, of course, the friction body must be insulated from the remaining parts of the transducer which form its housing. For attaining a sufficient longevity during operation it is however advantageous to fabricate the friction body of a material which is as wear resistant as possible. It is in this context that the term "material of great hardness" as used throughout this patent should be understood.

In the exemplary embodiment adjustable thread guide elements are provided as the means for adjusting the contact pressure between the thread and the friction body. However, it would be also possible to use different types of devices for adjusting the contact pressure, such as for instance thread clamping- or thread brake mechanisms which enable adjustment of the clamping pressure.

There can also be used for this purpose individually adjustable contact or press-on elements which act directly at the thread at its contact location with the friction body, for instance contact rollers with adjustable contact pressure. If desired, these are provided in addition to the thread guide elements which alone serve for guiding the individual threads and which need not be adjustable.

According to another embodiment of the inventive transducer the adjustment of the sensitivity for the individual threads can be achieved by varying the spacing between the friction body on the one hand and other components of the transducer, for instance the electrode body or the electrode bodies or a counter electrode or a number of counter electrodes, for instance parts of the housing on the other hand. Thus, in the arrangement of FIGS. 1 to 3 the sensitivity for all of the thread measuring locations can be simultaneously influenced by changing the spacing between the friction body 2 and the cover 7. In order to be able to separately change the sensitivity for the individual measuring locations, there can be provided for each measuring location a respective separately adjustable cover portion associated with each such measuring location and serving as the counter electrode. This has been indicated in FIG. 5 by the separate cover portions 7' and 7'' attached to the housing 14 and the projection 51, respectively.

Also for each thread measuring location, that is for each section of the friction body over which a thread is guided there can be provided a special electrode body, or it is possible to provide for each group of, for instance, two thread measuring locations a respective separate electrode body indicated at 4' and 4'' in FIG. 5 and connected with the pre-amplifier. It is then possible when utilizing separate amplifier channels which are connected to the individual electrode bodies to simultaneously monitor a number of traveling threads.

The inventive transducer can not only be successfully used for monitoring the movement of textile threads in the most widest sense including pre-spun threads, monofilaments and multifilaments, rather also can be used for metallic wires and heddle wires and thread-like structures formed of other materials, such as glass fiber strands, all by way of example. It is in this sense that the term "thread" or "thread-like" as used throughout this patent should be understood and such expression is employed with the broadest possible connotation.

While there is shown and described present preferred embodiments of the invention, it is to be distinctly understood that the invention is not limited thereto but may be otherwise variously embodied and practiced within the scope of the following claims.

What is claimed is:

1. A tribo-electrical transducer for monitoring the movement of thread-like structures, comprising a friction body against which bear the traveling threads, at least one electrode body arranged at said friction body, and a housing consisting of electrically conductive material serving as screening for the friction body and the electrode body, guide means for simultaneously guiding a number of threads over the friction body, and means for changing the contact pressure between at least one of the threads and the friction body.

2. The transducer as defined in claim 1, wherein there is provided only one such friction body constructed as a rod having a longitudinally extending bore, and that a single such electrode body is arranged in said longitudinal bore and extends at least over the useful length of the friction body.

3. The transducer as defined in claim 1, wherein said friction body is formed of electrically insulating material of great hardness.

4. The transducer as defined in claim 3, wherein said electrically insulating material of great hardness is ceramic oxide.

5. The transducer as defined in claim 1, wherein said friction body is formed of electrically conductive material of great hardness.

6. The transducer as defined in claim 2, further including a lengthwise extending support formed of electrically conductive material and upon which bears the friction body over its entire length.

7. The transducer as defined in claim 6, wherein said guide means embodies a respective row of adjustable guide elements attached at the support to both sides of longitudinal axis of the friction body.

8. The transducer as defined in claim 7, wherein each guide element is displaceable in the direction of an axis which perpendicularly intersects the longitudinal axis of the friction body.

9. The transducer as defined in claim 8, wherein each guide element consists of a guide plate provided with a slot, at least one guide ring mounted at each such guide plate, said guide ring being formed of insulating material of great hardness, and a screw guided through said slot and a transverse bolt for securing said guide plate to said support.

10. The transducer as defined in claim 6, wherein said guide means include guide plates, and further including a cover formed of an electrically conductive material arranged at the side of the friction body which is opposite said support, and wherein said support, said cover and said guide plates are conductively connected with one another so that they form said housing acting as said screening.

11. The transducer as defined in claim 1, further including a counter electrode consisting of a number of components which can be adjusted relative to the friction body in order to be able to separately regulate the transducer for each individual thread measuring location.

12. The transducer as defined in claim 1, wherein there is provided a single friction body and a number of electrode bodies, wherein each electrode body is associated with at least one at the friction body.

13. The transducer as defined in claim 1, further including amplifier means forming together with the transducer a structural unit.

14. A device for monitoring the movement of a plurality of filling threads on a shuttleless loom, comprising longitudinally extending friction means against which bear the traveling threads, at least one electrode body arranged at said friction means, means consisting of electrically conductive material serving as screening for the electrode body, and a number of guide means arranged lengthwise and at a distance from said friction means, means for adjustably mounting at least one of said guide means for changing the contact pressure of the associated thread and friction means.

* * * * *